United States Patent
Gaberthüel et al.

(10) Patent No.: US 10,989,581 B2
(45) Date of Patent: Apr. 27, 2021

(54) SENSOR FOR A THERMAL, FLOW MEASURING DEVICE HAVING SENSOR ELEMENT SPACING PROTRUSIONS

(71) Applicant: Endress+Hauser Flowtec AG, Reinach (CH)

(72) Inventors: Stephan Gaberthüel, Oberwil (CH); Alexander Grün, Lörrach (DE); Hanno Schultheis, Hermrigen (CH); Tobias Baur, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/312,026

(22) PCT Filed: Apr. 19, 2017

(86) PCT No.: PCT/EP2017/059259
§ 371 (c)(1),
(2) Date: Dec. 20, 2018

(87) PCT Pub. No.: WO2018/001593
PCT Pub. Date: Jan. 4, 2018

(65) Prior Publication Data
US 2019/0376827 A1   Dec. 12, 2019

(30) Foreign Application Priority Data
Jun. 27, 2016 (DE) .................... 10 2016 111 701.3

(51) Int. Cl.
G01F 15/00 (2006.01)
G01F 1/688 (2006.01)

(52) U.S. Cl.
CPC .............. G01F 15/00 (2013.01); G01F 1/688 (2013.01)

(58) Field of Classification Search
CPC .................... G01F 15/00; G01F 1/68
See application file for complete search history.

(56) References Cited

U.S. PATENT DOCUMENTS

| | | | |
|---|---|---|---|
| 4,439,918 A | 4/1984 | Carroll, II et al. | |
| 4,626,478 A | 12/1986 | Van Dyk Soerewyn | |
| | | (Continued) | |

FOREIGN PATENT DOCUMENTS

| | | |
|---|---|---|
| CN | 101553715 A | 10/2009 |
| CN | 201600156 U | 10/2010 |
| | (Continued) | |

OTHER PUBLICATIONS

Search Report for German Patent Application No. 10 2016 111 701.3, German Patent Office, dated Feb. 14, 2017, 5 pp.
(Continued)

*Primary Examiner* — Harshad R Patel
(74) *Attorney, Agent, or Firm* — Mark A. Logan; Endress+Hauser (USA) Holding Inc.

(57) ABSTRACT

Disclosed is a sensor of a thermal, flow measuring device. The sensor includes a sensor cup having at least one protrusion on the floor of the cup that assures a constant spacing of a sensor element from the cup floor so that a good temperature transfer between the sensor element and a medium flowing around the sensor is assured. Also disclosed is a thermal, flow measuring device employing such a sensor.

13 Claims, 4 Drawing Sheets

(56) References Cited

U.S. PATENT DOCUMENTS

| | | | |
|---|---|---|---|
| 6,953,145 B2 | 10/2005 | Wolf et al. | |
| 9,885,360 B2* | 2/2018 | Boese | F04D 15/0066 |
| 10,479,555 B2* | 11/2019 | Lee | B65D 21/08 |
| 2008/0034887 A1* | 2/2008 | Rieder | G01F 1/662 |
| | | | 73/861.28 |
| 2009/0050678 A1* | 2/2009 | Yamamoto | B23K 1/0016 |
| | | | 228/180.22 |
| 2014/0109664 A1* | 4/2014 | Wiest | G01F 1/69 |
| | | | 73/204.22 |
| 2015/0153208 A1* | 6/2015 | Arnold | G01F 1/69 |
| | | | 73/204.11 |
| 2015/0276503 A1* | 10/2015 | Grun | G01K 1/08 |
| | | | 73/204.22 |
| 2016/0103020 A1 | 4/2016 | Liehr et al. | |
| 2018/0087950 A1* | 3/2018 | Niemann | G01N 29/221 |
| 2019/0003869 A1* | 1/2019 | Hackert | A47J 36/321 |

FOREIGN PATENT DOCUMENTS

| | | |
|---|---|---|
| CN | 102620780 A | 8/2012 |
| DE | 10031879 A1 | 4/2001 |
| DE | 102005008491 A1 | 11/2005 |
| DE | 102011089597 A1 | 6/2013 |
| DE | 102012206647 A1 | 10/2013 |
| DE | 102013208785 A1 | 11/2014 |
| WO | 0214008 A1 | 2/2002 |

OTHER PUBLICATIONS

Search Report for International Patent Application No. PCT/EP2017/059259, WIPO, dated Jul. 20, 2017, 13 pp.

* cited by examiner

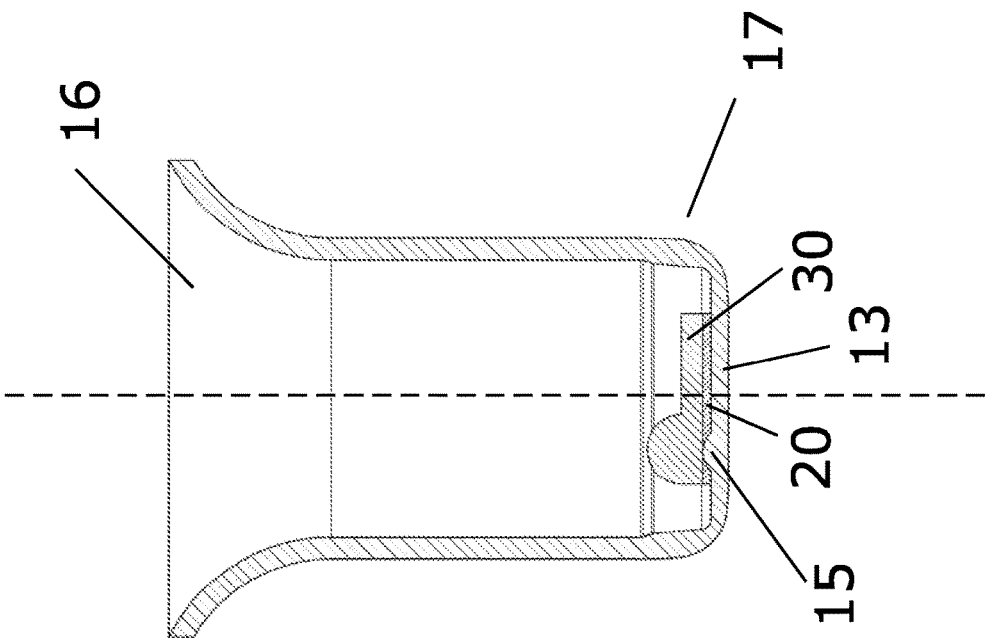
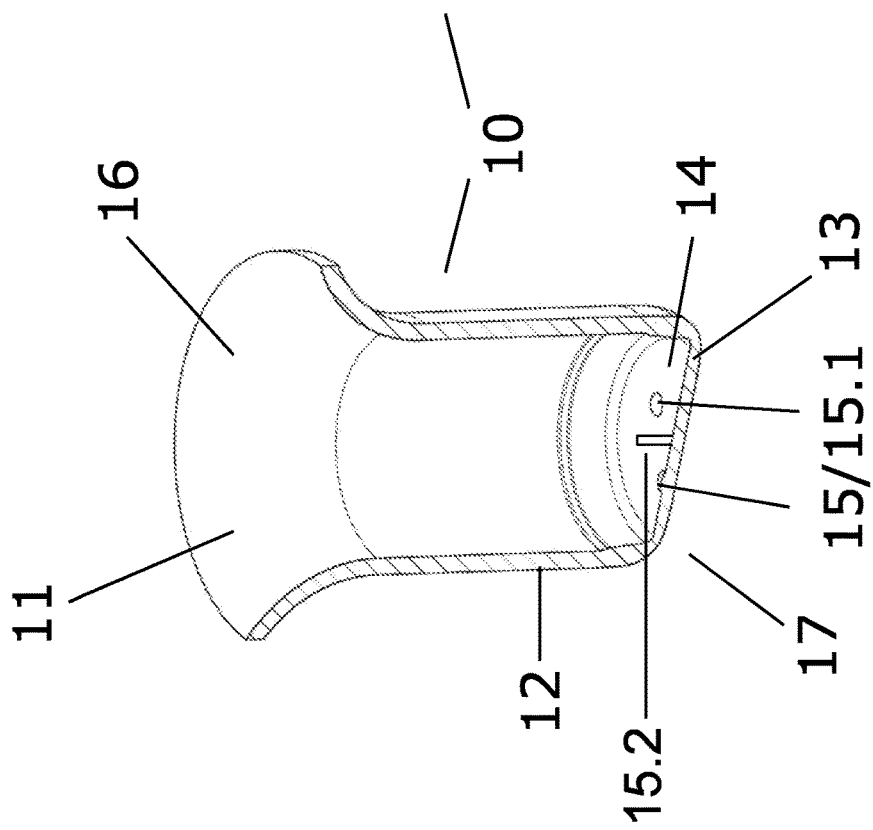

SENSOR FOR A THERMAL, FLOW MEASURING DEVICE HAVING SENSOR ELEMENT SPACING PROTRUSIONS

CROSS-REFERENCE TO RELATED APPLICATIONS

The present application is related to and claims the priority benefit of German Patent Application No. 10 2016 111 701.3, filed on Jun. 27, 2016 and International Patent Application No. PCT/EP2017/059259 filed on Apr. 19, 2017, the entire contents of which are incorporated herein by reference.

TECHNICAL FIELD

The invention relates to a sensor for a thermal, flow measuring device, to a thermal, flow measuring device having a sensor of the invention and to a method for manufacturing a sensor of the invention for a thermal, flow measuring device.

BACKGROUND

Thermal flow measuring devices have been used for a long time to determine the mass flow of a medium through a pipeline. In such case, such devices rely essentially on two measuring principles.

In the case of a first measuring principle, a sensor in the medium flowing through the pipeline is heated in such a manner that its temperature remains constant. Assuming that media properties such as temperature, density and composition remain constant, the mass flow of the medium can be ascertained via the heating current needed for holding the temperature constant. In the case of variable media temperature, a second sensor is used for measuring the temperature of the medium.

In the case of a second measuring principle, the flowing medium is heated with a constant heating power and the temperature of the medium downstream is measured. A higher mass flow leads to a lower measured temperature, and vice versa. Also in this case, it is helpful to use a sensor for monitoring the temperature of the medium. In the case of heated sensors, a reproducible manufacturing is important for achieving a high accuracy of measurement. If the solder layer thickness varies from sensor to sensor, then the required heating current varies also. In order that the flow measurement functions correctly, it is essential that temperature equilibration between sensor and medium occur rapidly and that fluctuations as regards this variable between individual sensors be as small as possible.

A typical sensor, in such case, comprises a sensor cup, in which a sensor element is arranged and bonded per solder layer to the sensor cup. In such case, a uniform thickness of the solder layer between sensor cup and sensor element is desired, in order to achieve a high accuracy of measurement. In soldering technology, solutions are known, which lead to a small solder layer thickness fluctuation, however, not to a satisfactory extent or in a manner disadvantageous for the sensors of a thermal, flow measuring device. Thus, U.S. Pat. No. 4,626,478 discloses an object with spacers, which assure a spacing between the object and a substrate. It is, however, very complicated to provide a sensor element with such spacers.

SUMMARY

An object of the invention is, consequently, to provide a sensor for a thermal, flow measuring device, a thermal, flow measuring device and a method for manufacturing a sensor of a thermal, flow measuring device, wherein the spacing of the sensor element from the sensor cup is fixed, without that the sensor element must be complexly formed.

The object is achieved by a sensor of the invention as defined in the independent claim 1 as well as by a thermal, flow measuring device as defined in the independent claim 11 and by a method for manufacturing a sensor of the invention as defined in claim 13.

The sensor of the invention for a thermal, flow measuring device comprises:

a sensor cup, wherein the sensor cup has a first longitudinal axis and a lateral surface as well as an open end and a closed second end with a cup floor, wherein the longitudinal axis intersects the first end and the second end preferably perpendicularly, and wherein a floor surface of the cup floor facing in the direction of the first end is essentially flat;

at least one sensor element, wherein the sensor element is arranged in the sensor cup in the region of the sensor cup floor; and a solder layer adapted to connect the sensor element thermally with the cup floor, wherein at least one protrusion extends from the floor surface, which protrusion is adapted to position the sensor element in a defined manner relative to the floor surface, wherein the sensor element is in direct contact with the at least one protrusion.

In an embodiment, the sensor cup has an inner diameter relative to a cross sectional area perpendicular to the first longitudinal axis, wherein the cross sectional area contains a point of a protrusion highest in the direction of the open end, wherein the protrusion has a spacing from the first longitudinal axis, wherein the spacing is less than a third of the value of the inner diameter.

In an embodiment, the at least one protrusion is adapted to assure a constant spacing between the floor surface and the sensor element.

In an embodiment of the sensor, the protrusion has a contact area, which forms especially an annular, polygonal or cross shaped structure.

In an embodiment of the sensor, at least two protrusions extend from the floor surface, wherein a first protrusion is a linear protrusion and a second protrusion is a point protrusion or a linear protrusion. A point protrusion has, in such case, a geometry, which with strict mathematical consideration results in a null dimensional point shaped support for the sensor element. In the case of taking into consideration physical conditions, of course, the pointedness of the support is only a rough simplification of the actual situation, so that, in reality, a 2-dimensional support is present, wherein this 2-dimensional support is less than 1% and especially less than 1‰ of a base area of the sensor element. The equivalent holds for a linear protrusion, in that its geometry has in the case of strict mathematical consideration a one dimensional, line shaped, support surface, wherein, in reality, a 2-dimensional support is present, wherein this 2-dimensional support amounts to less than 5% and especially less than 5‰ of a base area of the sensor element In an embodiment of the sensor, there extend from the floor surface three point protrusions, which define a triangle.

In an embodiment of the sensor, the protrusion extends at most 200 µm and especially at most 150 µm and preferably at most 100 µm from the floor surface.

In an embodiment of the sensor, the protrusion extends at least 20 µm and especially at least 50 µm and preferably at least 70 µm from the floor surface.

In an embodiment of the sensor, the sensor cup has in the region of the cup floor a wall thickness of at most 1.2 mm and especially at most 1 mm and preferably at most 0.8 mm.

In an embodiment of the sensor, the sensor cup has in the region of the cup floor a wall thickness of at least 0.1 mm and especially at least 0.2 mm and preferably at least 0.4 mm.

In an embodiment of the sensor, the sensor element comprises a thermistor.

In an embodiment of the sensor, the sensor cup, not taking into consideration the at least one protrusion, is essentially rotationally symmetric.

The thermal, flow measuring device of the invention for measuring the mass flow of a medium in a measuring tube having at least one sensor of the invention includes:
  a measuring tube with a second longitudinal axis;
  at least one sensor in the measuring tube; and
  an electronic operating circuit, which is adapted to operate the at least one sensor.

In an embodiment of the flow measuring device, the flow measuring device includes at least two sensors,
  wherein the electronic operating circuit is adapted to heat at least a first sensor, especially to supply such with a heating current,
  wherein the electronic operating circuit is adapted to determine the temperature of the medium by means of at least a second sensor.

The method of the invention for manufacturing a sensor of the invention for a thermal, flow measuring device for measuring the mass flow of a medium in a measuring tube includes, in such case, method steps as follows:
  producing at least one protrusion extending from a floor surface of a cup floor of a sensor cup;
  applying a solder layer on the cup floor;
  melting the solder layer and pressing a sensor element against the protrusion, wherein the sensor element contacts the protrusion by means of a sensor element base area.

In an embodiment of the method, the production of the protrusion occurs by forming the cup floor by means of a die, wherein the die has a recess, which is inverse to the protrusion.

In an embodiment, the method includes manufacturing the sensor cup by deep drawing, wherein the cup is formed from a sheet.

Thus, the present invention provides a sensor of a thermal, flow measuring device, a thermal, flow measuring device and a method for manufacturing a sensor of a thermal, flow measuring device for measuring the mass flow of a medium in a measuring tube.

BRIEF DESCRIPTION OF THE DRAWING

The invention will now be explained based on examples of embodiments presented in the appended drawing, the figures of which show as follows:

FIG. 1 shows a schematic representation of the sensor cup as well as of the sensor using subFIGS. 1.1 and 1.2, wherein subFIG. 1.1 is a schematic, perspective view of a longitudinally sectioned sensor cup of a sensor of the invention and subFIG. 1.2 is a longitudinal section of a sensor of the invention, including sensor cup and installed sensor element.

DETAILED DESCRIPTION

Figure 2:
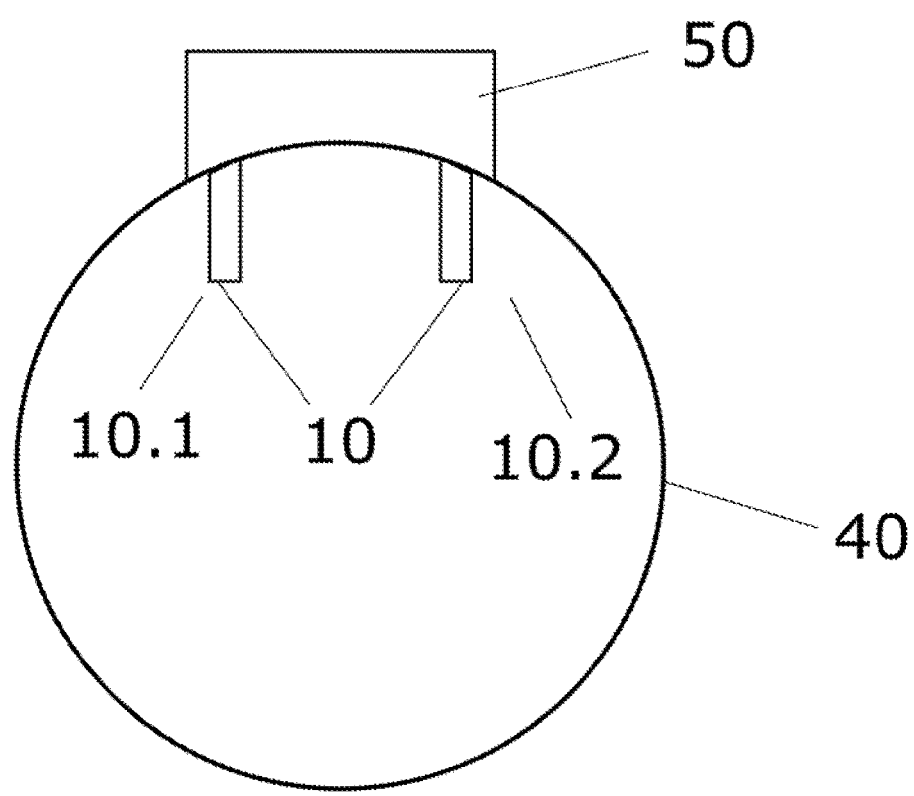
FIG. 2 shows a schematic cross section through a thermal, flow measuring device of the invention.

FIG. 1, subFIG. 1.1, shows a sensor cup 11 with a lateral surface 12, a cup floor 13 and a floor surface 14, wherein the cup floor 13 has a protrusion 15 and a point protrusion 15.1 that extend from the floor surface 14 of the cup floor 13 in the direction of the open end 16 of the sensor cup. The sensor cup, not taking into consideration the protrusions 15, 15.1 is essentially rotationally symmetric relative to a first longitudinal axis 18; see FIG. 1, subFIG. 1.2.

FIG. 1, subFIG. 1.2, shows a sensor 10, wherein there is arranged in the sensor cup 11 a sensor element 30, which is connected thermally with the cup floor 13 via a solder layer 20. The defined positioning assured by the protrusions 15, especially the uniform spacing of the sensor element 30 from the cup floor 13, provides a uniform temperature transfer with small fluctuations over different sensors, wherein the sensor element is in direct contact with the at least one protrusion via a sensor element base area, in order to lessen resistance to heat transfer between sensor element 30 and a medium flowing around the sensor cup. Ideally, in such case, the sensor is not seated on the at least one protrusion via an outer region of the sensor element base area. Especially, the at least one protrusion 15 extends from a central region of the cup floor, wherein a spacing of the at least one protrusion from the first longitudinal axis 18 is less than a third of an inner diameter of the floor surface 14. In this way, a destruction of the sensor element by the production of bending moments in the sensor element during the mounting of the sensor element can be prevented.

The inner diameter, in such case, is that of a cross sectional area perpendicular to the first longitudinal axis, wherein the cross sectional area contacts a highest point of at least one protrusion in the direction of the open end 16.

FIG. 2 shows a schematic cross section of a thermal, flow measuring device of the invention having a measuring tube 40, two sensors 10 of the invention arranged in the lumen of the measuring tube 40, and an electronic operating circuit 50 adapted to operate the sensors.

In order to measure the mass flow of a medium through the measuring tube 40, for example, a sensor 10.1 in the medium flowing through the measuring tube 40 is heated in such a manner that a temperature difference relative to the media temperature remains constant. Helpfully, a second sensor 10.2 is used for measuring the temperature of the medium. Sensor 10.2 is arranged in front of, or, as shown in FIG. 2, beside the heated sensor 10.1, in order to maintain the temperature difference. Assuming that media properties, such as density or composition, remain constant, the mass flow of the medium can be ascertained via the heating current needed for maintaining the temperature.

Figure 4:
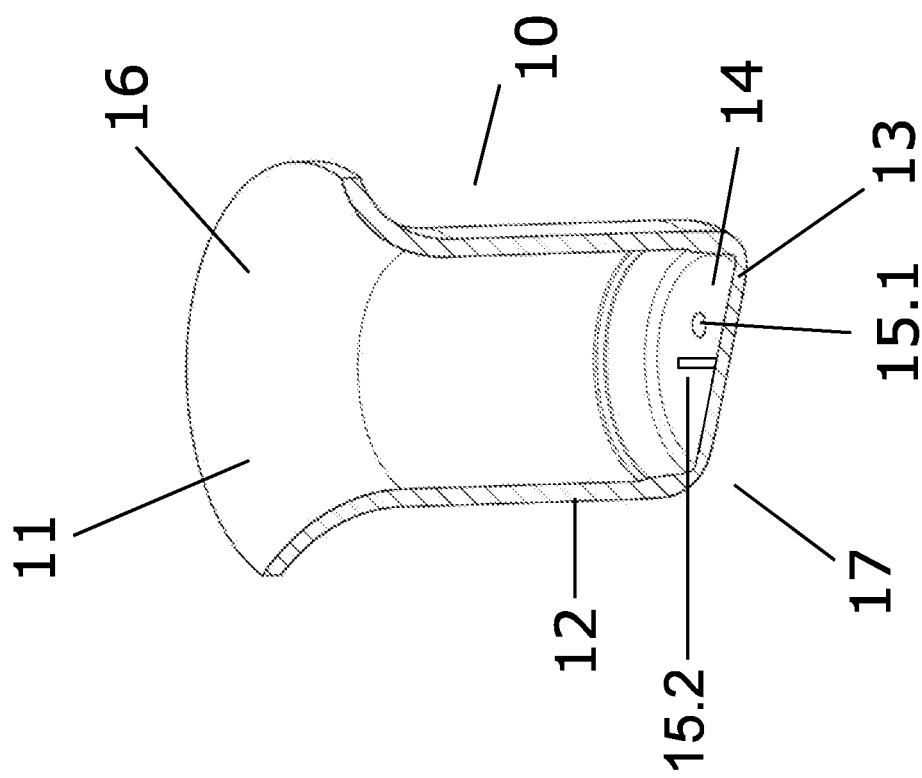
FIG. 4 shows a schematic, perspective view of a longitudinally sectioned sensor cup of a sensor of the invention having a point protrusion and a line protrusion.

FIG. 4 shows a sensor cup 11 having a lateral surface 12, a cup floor 13, and a floor surface 14. The cup floor 13 has a point protrusion 15.1 and a linear protrusion 15.2. Both protrusions 15.1, 15.2 extend from the floor surface 14 of the cup floor 13 in the direction of the open end 16 of the sensor cup.

Figure 3:
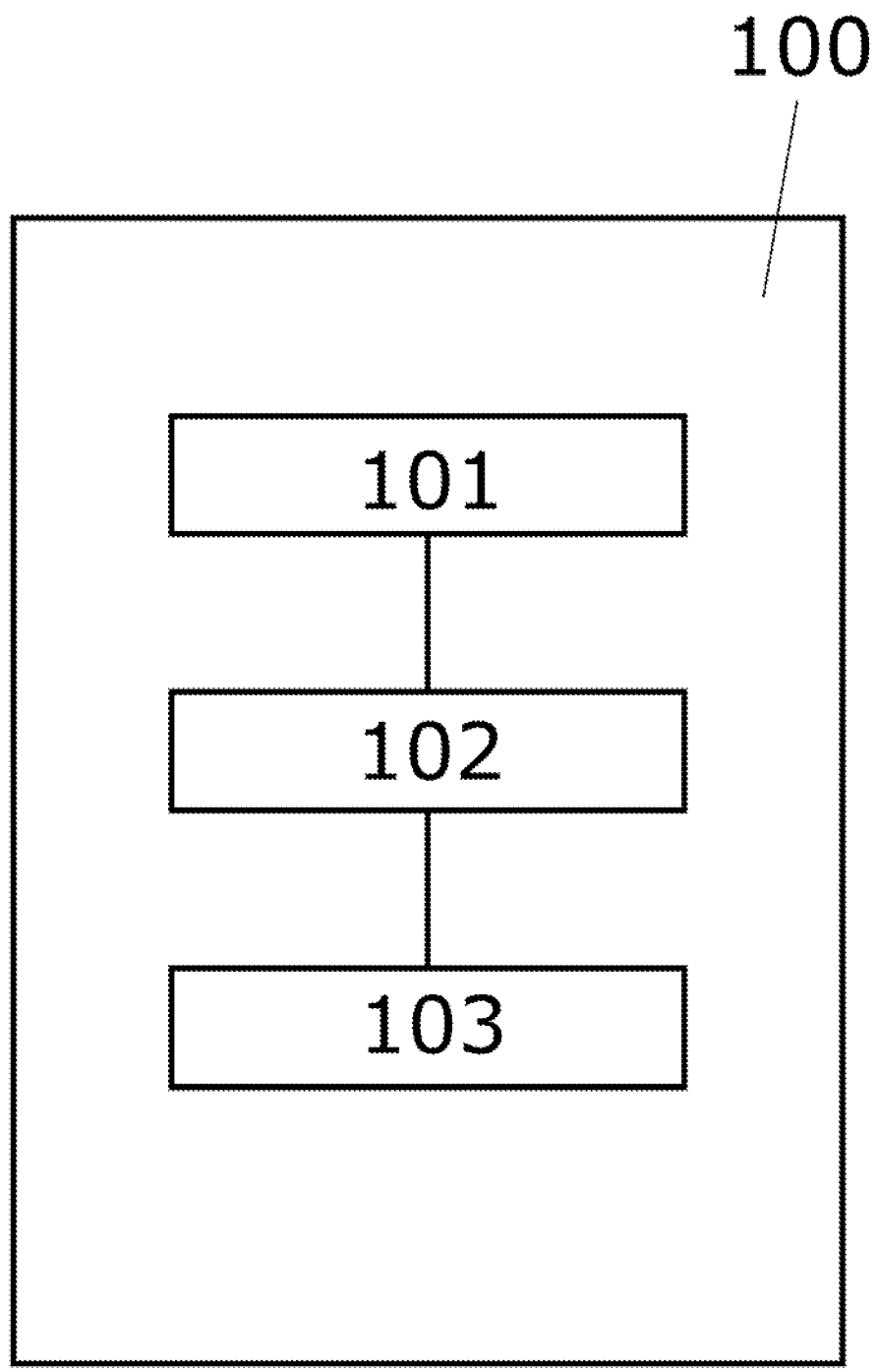
FIG. 3 is a schematic process flow diagram for manufacturing a sensor of the invention.

FIG. 3 represents the course of a method of the invention 100 for manufacturing a sensor 10 of the invention.

In a first method step 101, at least one protrusion is produced from the floor surface 14 of the cup floor 13 of the sensor cup 11. This is performed, for example, by deformation. The sensor cup is manufactured, for example, from a sheet by a deep draw method.

In a second method step 102, the solder layer 20 is applied on the cup floor 13;

In a third method step 103, the solder layer 20 is melted and the at least one sensor element 30 pressed against the at least one protrusion 15;

Upon subsequent cooling of the solder layer 20 to below its melting point, the sensor element 30 has a fixed spacing from the cup floor 13 and is thermally connected therewith via the solder layer 20.

The invention claimed is:

1. A sensor for a thermal, flow measuring device, comprising:
    a sensor cup having a first longitudinal axis, a lateral surface, an open first end, and a closed second end with a cup floor, wherein the first longitudinal axis intersects the first end and the second end perpendicularly, and wherein a floor surface of the cup floor facing in the direction of the first end is essentially flat;
    a sensor element arranged in the sensor cup in a region of the cup floor; and
    a solder layer adapted to connect the sensor element thermally with the cup floor,
    wherein a first protrusion and a second protrusion extend from the floor surface, wherein the first protrusion is a linear protrusion and the second protrusion is a point protrusion or a linear protrusion, wherein the two protrusions are adapted to position the sensor element in a defined manner relative to the floor surface, and wherein the sensor element is in direct contact with the two protrusions.

2. The sensor as claimed in claim 1, wherein the sensor cup has an inner diameter relative to a cross sectional area perpendicular to the first longitudinal axis, wherein the cross sectional area contains a point of a protrusion highest in the direction of the open end, and wherein the two protrusions have a spacing from the first longitudinal axis, wherein the spacing is less than a third of the inner diameter.

3. The sensor as claimed in claim 1, wherein the two protrusions are adapted to assure a constant spacing between the floor surface and the sensor element.

4. The sensor as claimed in claim 1, wherein each protrusion extends at most 100 µm from the floor surface.

5. The sensor as claimed in claim 1, wherein each protrusion extends at least 70 µm from the floor surface.

6. The sensor as claimed in claim 1, wherein the sensor cup has in the region of the cup floor a wall thickness of at most 0.8 mm.

7. The sensor as claimed in claim 1, wherein the sensor cup has in the region of the cup floor a wall thickness of at least 0.4 mm.

8. A thermal, flow measuring device for measuring the mass flow of a medium in a measuring tube, comprising:
    at least one sensor including:
        a sensor cup having a first longitudinal axis, a lateral surface, an open first end, and a closed second end with a cup floor, wherein the first longitudinal axis intersects the first end and the second end perpendicularly, and wherein a floor surface of the cup floor facing in the direction of the first end is essentially flat;
        a sensor element arranged in the sensor cup in the region of the cup floor; and
        a solder layer adapted to connect the sensor element thermally with the cup floor,
        wherein at least one protrusion extends from the floor surface, the at least one protrusion adapted to position the sensor element in a defined manner relative to the floor surface, and
        wherein the sensor element is in direct contact with the at least one protrusion;
    a measuring tube having a second longitudinal axis, wherein the sensor is disposed in the measuring tube; and
    an electronic operating circuit adapted to operate the at least one sensor.

9. The flow measuring device as claimed in claim 8, wherein the thermal, flow measuring device includes at least two sensors,
    wherein the electronic operating circuit is adapted to heat a first sensor, and
    wherein the electronic operating circuit is adapted to determine the temperature of the medium using a second sensor.

10. A sensor for a thermal, flow measuring device, comprising:
    a sensor cup having a first longitudinal axis, a lateral surface, an open first end, and a closed second end with a cup floor, wherein the first longitudinal axis intersects the first end and the second end perpendicularly, and wherein a floor surface of the cup floor facing in the direction of the first end is essentially flat;
    a sensor element arranged in the sensor cup in a region of the cup floor; and
    a solder layer adapted to connect the sensor element thermally with the cup floor,
    wherein three point protrusions extend from the floor surface and the three point protrusions define a triangle, wherein the three protrusions are adapted to position the sensor element in a defined manner relative to the floor surface, and wherein the sensor element is in direct contact with the three protrusions.

11. The sensor as claimed in claim 10, wherein the sensor cup has an inner diameter relative to a cross sectional area perpendicular to the first longitudinal axis, wherein the cross sectional area contains a point of a protrusion highest in the direction of the open end, and wherein the three protrusions have a spacing from the first longitudinal axis, wherein the spacing is less than a third of the inner diameter.

12. The sensor as claimed in claim 10, wherein the three protrusions are adapted to assure a constant spacing between the floor surface and the sensor element.

13. A sensor for a thermal, flow measuring device, comprising:
    a sensor cup having a first longitudinal axis, a lateral surface, an open first end, and a closed second end with a cup floor, wherein the first longitudinal axis intersects the first end and the second end perpendicularly, and wherein a floor surface of the cup floor facing in the direction of the first end is essentially flat;
    a sensor element arranged in the sensor cup in a region of the cup floor; and
    a solder layer adapted to connect the sensor element thermally with the cup floor,
    wherein at least one protrusion extends from the floor surface and the at least one protrusion has a contact area forming an annular, a polygonal, or a cross-shaped structure,
    wherein the at least one protrusion is adapted to position the sensor element in a defined manner relative to the floor surface, and wherein the sensor element is in direct contact with the at least one protrusion.

* * * * *